F. L. HARMON.

DUPLEX EYELETER.

APPLICATION FILED JAN. 2, 1920.

Reissued Aug. 17, 1920.

14,932.

5 SHEETS—SHEET 1.

WITNESSES:

Louis T. La Forest.

E. A. Harris.

INVENTOR

FRANK L. HARMON

BY Henry J. Miller

ATTORNEY

F. L. HARMON.

DUPLEX EYELETER.

APPLICATION FILED JAN. 2, 1920.

Reissued Aug. 17, 1920.

14,932.

5 SHEETS—SHEET 2.

WITNESSES:
Louis T. LaForest.
E. A. Harris

INVENTOR
FRANK L. HARMON
BY Henry J. Miller
ATTORNEY

F. L. HARMON.

DUPLEX EYELETER.

APPLICATION FILED JAN. 2, 1920.

Reissued Aug. 17, 1920.

14,932.

5 SHEETS—SHEET 3.

WITNESSES:

Louis R. La Forest.

E. A. Harris

INVENTOR

FRANK L. HARMON

BY Henry J. Miller

ATTORNEY

F. L. HARMON.
DUPLEX EYELETER.
APPLICATION FILED JAN. 2, 1920.
Reissued Aug. 17, 1920.
14,932.
5 SHEETS—SHEET 4.
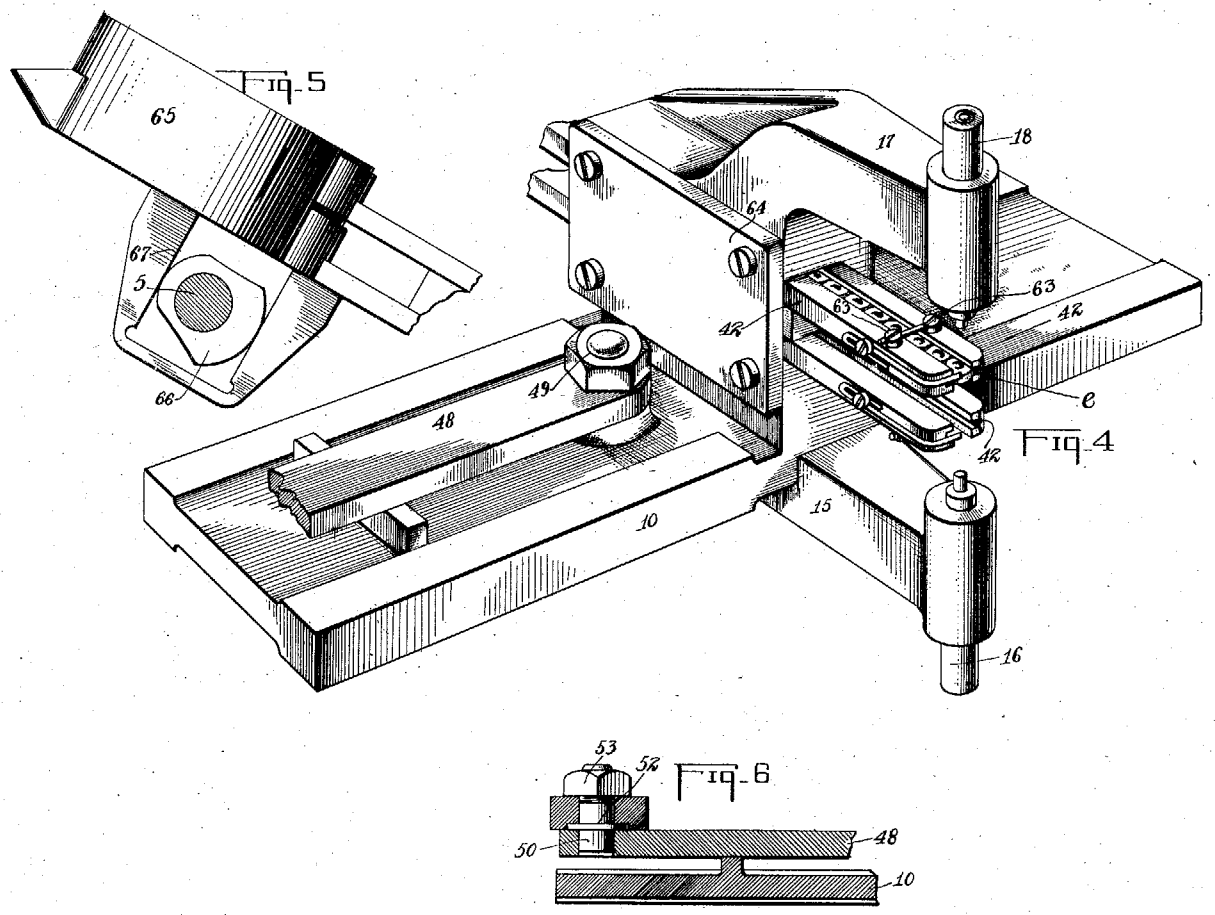
WITNESSES:
Louis P. La Forest.
E. A. Harris.
INVENTOR
FRANK L. HARMON
BY Henry J. Miller
ATTORNEY F. L. HARMON.
DUPLEX EYELETER.
APPLICATION FILED JAN. 2, 1920.
Reissued Aug. 17, 1920.
14,932.
5 SHEETS—SHEET 5.
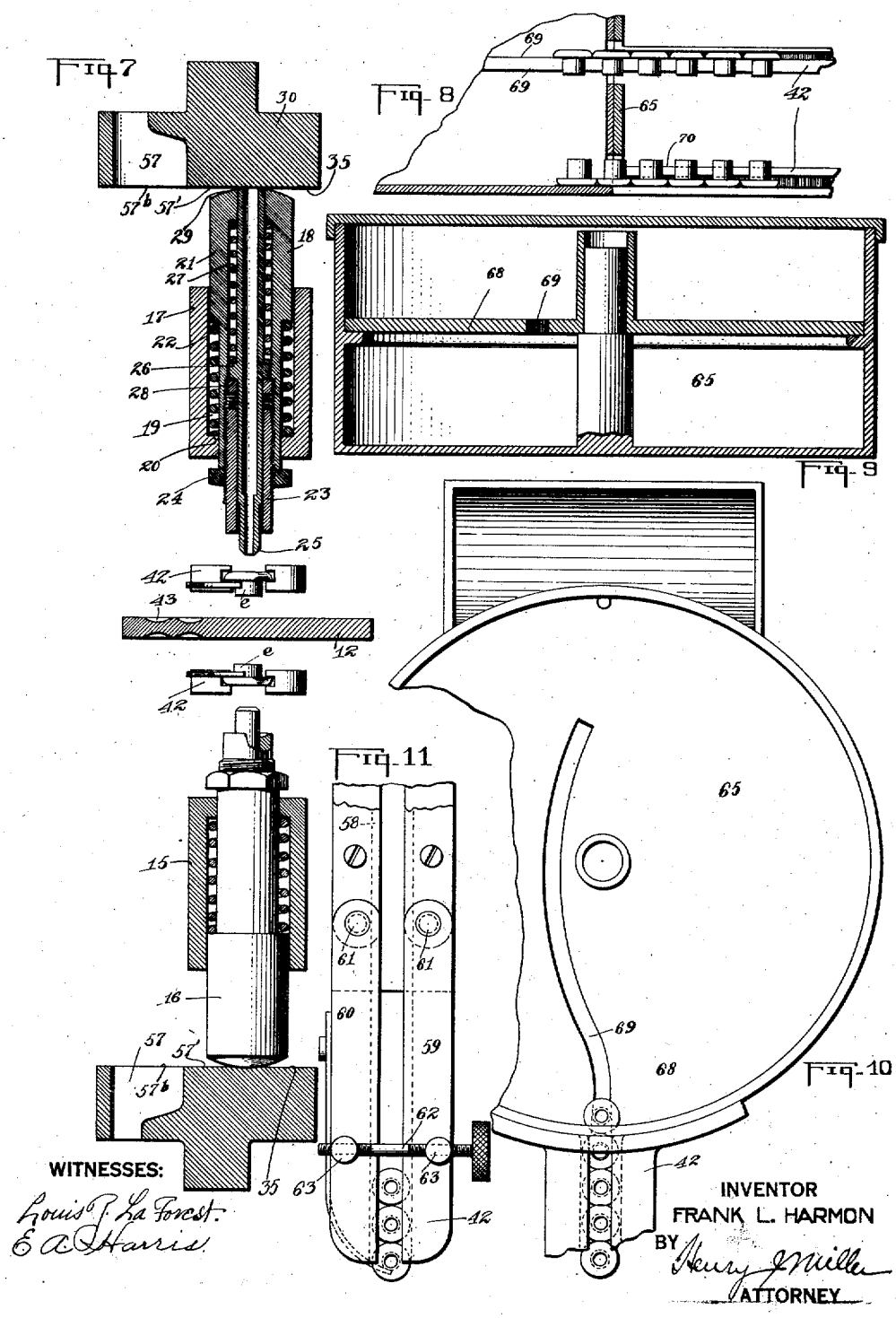
WITNESSES:
Louis P. La Forest.
E. A. Harris.
INVENTOR
FRANK L. HARMON
BY Henry J. Miller
ATTORNEY

UNITED STATES PATENT OFFICE.

FRANK L. HARMON, OF BEVERLY, MASSACHUSETTS, ASSIGNOR TO SINGER MANUFACTURING COMPANY, OF ELIZABETH, NEW JERSEY, A CORPORATION OF NEW JERSEY.

DUPLEX EYELETER.

14,932. Specification of Reissued Letters Patent. Reissued Aug. 17, 1920.

Original No. 1,262,583, dated April 9, 1918, Serial No. 836,324, filed May 4, 1914. Application for reissue filed January 2, 1920. Serial No. 349,030.

*To all whom it may concern:*

Be it known that I, FRANK L. HARMON, a citizen of the United States, residing at Beverly, in the county of Essex and State of Massachusetts, have invented certain new and useful Improvements in Duplex Eyeleters, of which the following is a specification, reference being had therein to the accompanying drawings.

This invention relates to duplex or double eyeleting machines of a type wherein the usual spindle-and-set mechanism is eliminated, and in which the punches insert the eyelets into the holes, the material being fed for the eyelet spacing preferably by a lateral movement of the punches. According to my invention I mount a telescopically combined punch and set at each side of a material support preferably in opposite relation, the two sides of the material support being formed and adapted to serve as punch block clenching surfaces. The operating parts of each of the punch and set mechanisms at the respective sides of the material support are all on the same side of the support, whereby a great simplification of operating mechanism is made possible. I believe that the present duplex machine is the first of this type in which a telescopically combined punch and set disposed in opposite or duplex relations is employed; also that I am the first to dispense with the usual sets having spindles therein, in such a duplex machine. It will be understood that there is a great advantage in doing away with the spindles and sets together with the necessary operating mechanism therefor, since such operating mechanism in a duplex machine is necessarily relatively complex and involved. I believe that any employment of sets with telescopic punches therein in conjunction with an eyelet spacing feed of the material is within the spirit of the present invention as hereinafter developed. According to a further feature of the invention the punches and sets are mounted for rectilinear movement both for feeding and for their operative strokes, instead of in a curved line as has been usual heretofore, this contributing materially to rapid and accurate guiding of the work. A further feature has to do with an improved mounting of the punches and sets whereby they are all carried and held in correct alinement by a single mounting element; this insuring that the spacing of the eyelets in one piece of material shall be exactly the same as in the other being operated on.

A further feature has to do with an improved construction of punch telescopically combined with a hollow set and adjusting provision therefor. A still further feature has to do with an improved mechanism for supplying eyelets from a hopper in two raceways with the heads of the eyelets in the two raceway lines facing oppositely.

A still further object has to do with an adjustment of the delivery ends of the raceways for delivering different sized eyelets.

The above and other objects and features of the invention will be better understood from the following detailed description taken in connection with the accompanying drawings and will be thereafter pointed out in the appended claims.

Referring to the drawings:

Fig. 4 is a perspective showing the common carrier of the punches and sets and the raceways, detached from the rest of the machine;

Fig. 5 is an elevation of the eyelet supply hopper with coöperating parts broken away;

Fig. 6 is a sectional detail showing a connection for effecting the transverse movement of the punches and sets;

Fig. 7 is an enlarged detail partly in section and partly in elevation of the immediate working parts of the machine;

Fig. 8 is a fragmentary sectional detail showing a delivery portion of the eyelet hopper and a part of the raceways;

Fig. 9 is a transverse section through the eyelet hopper;

Fig. 10 is a plan view of the eyelet hopper with the cover removed and a part broken away; and Fig. 11 is a fragmentary elevation of the delivery portion of an eyelet chute.

Figure 1:
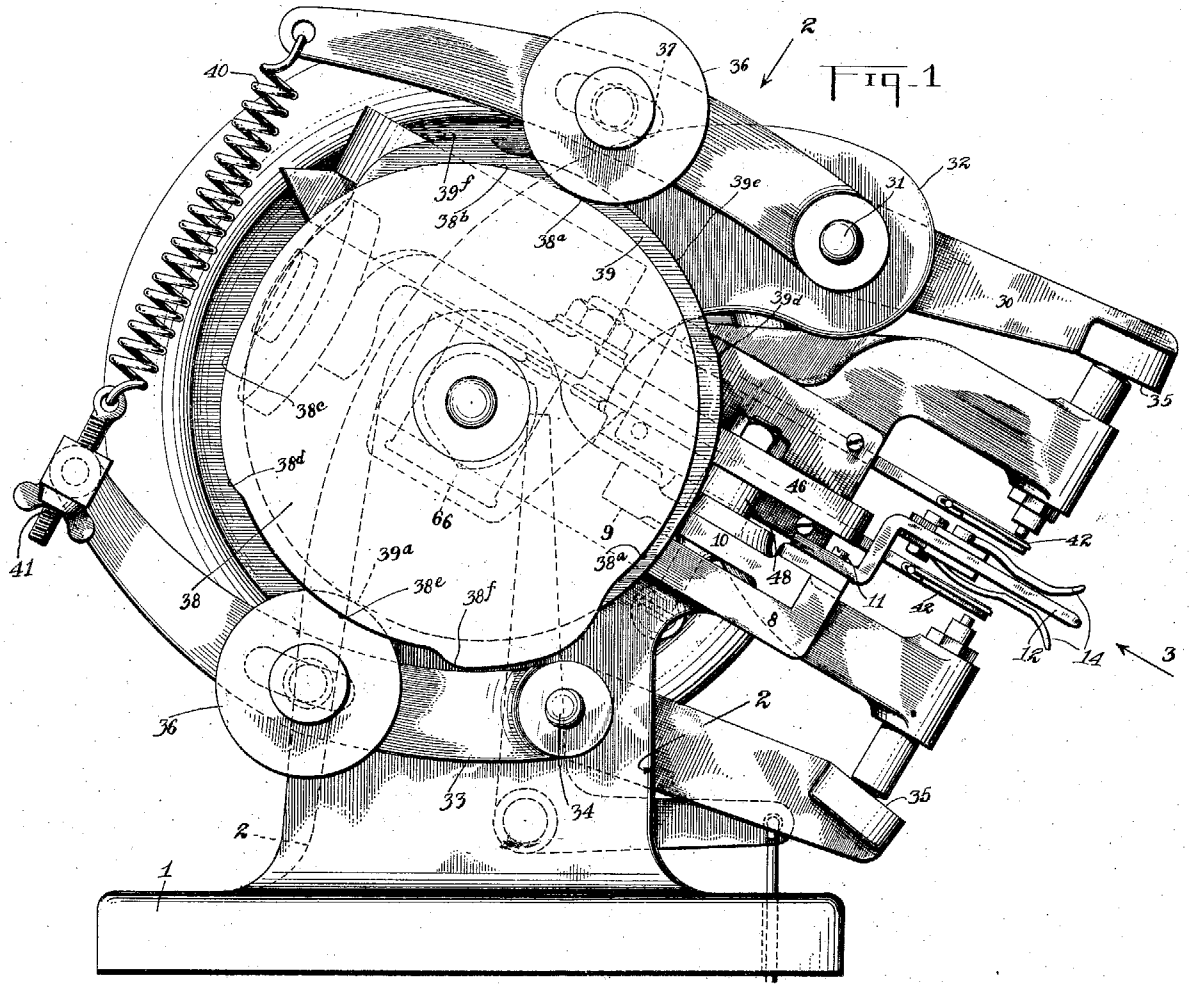
Figure 1 is a side elevation of a machine constructed in accordance with my invention.
Figure 2:
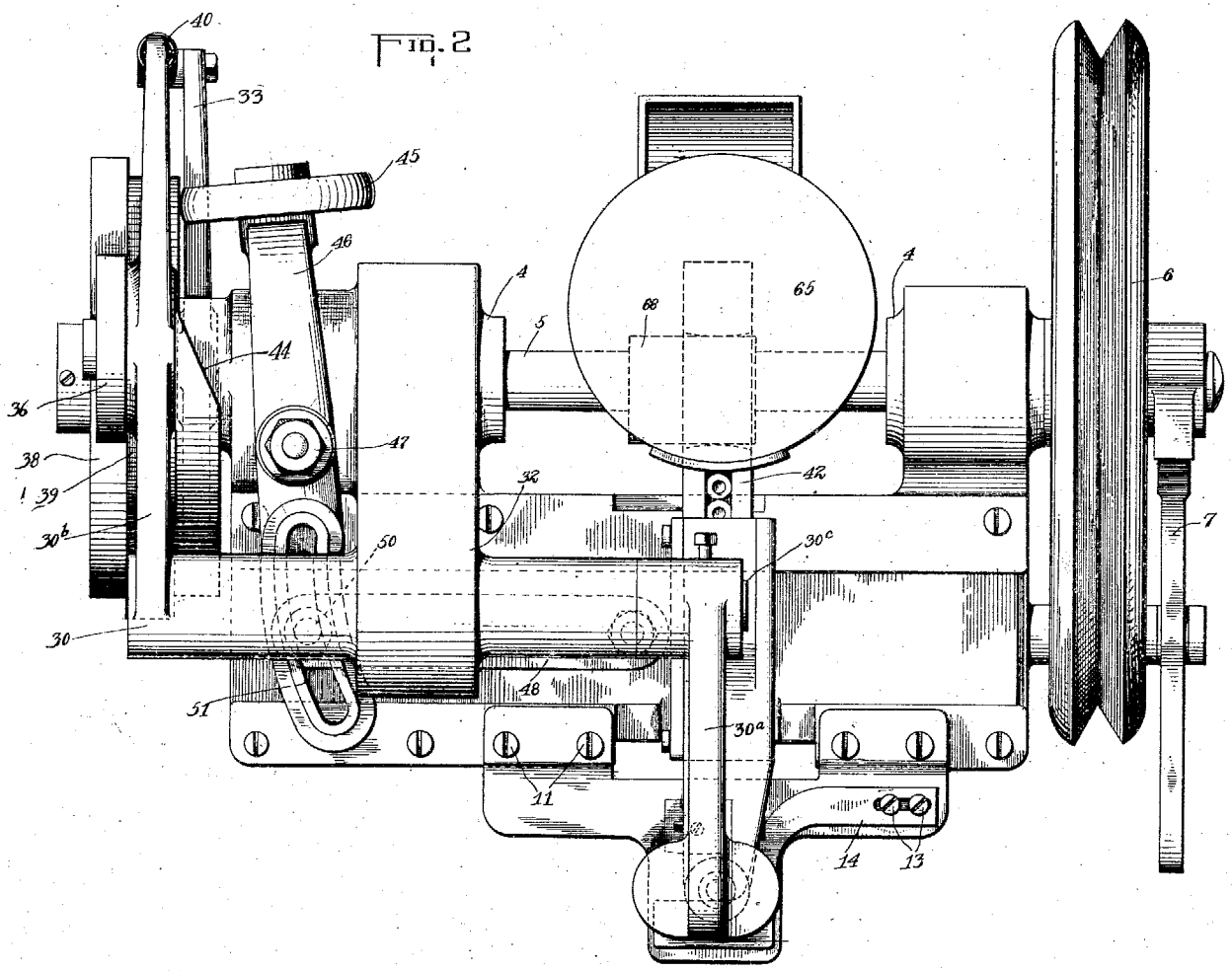
Fig. 2 is a plan view thereof looking in the direction of arrow 2 in Fig. 1.
Figure 3:
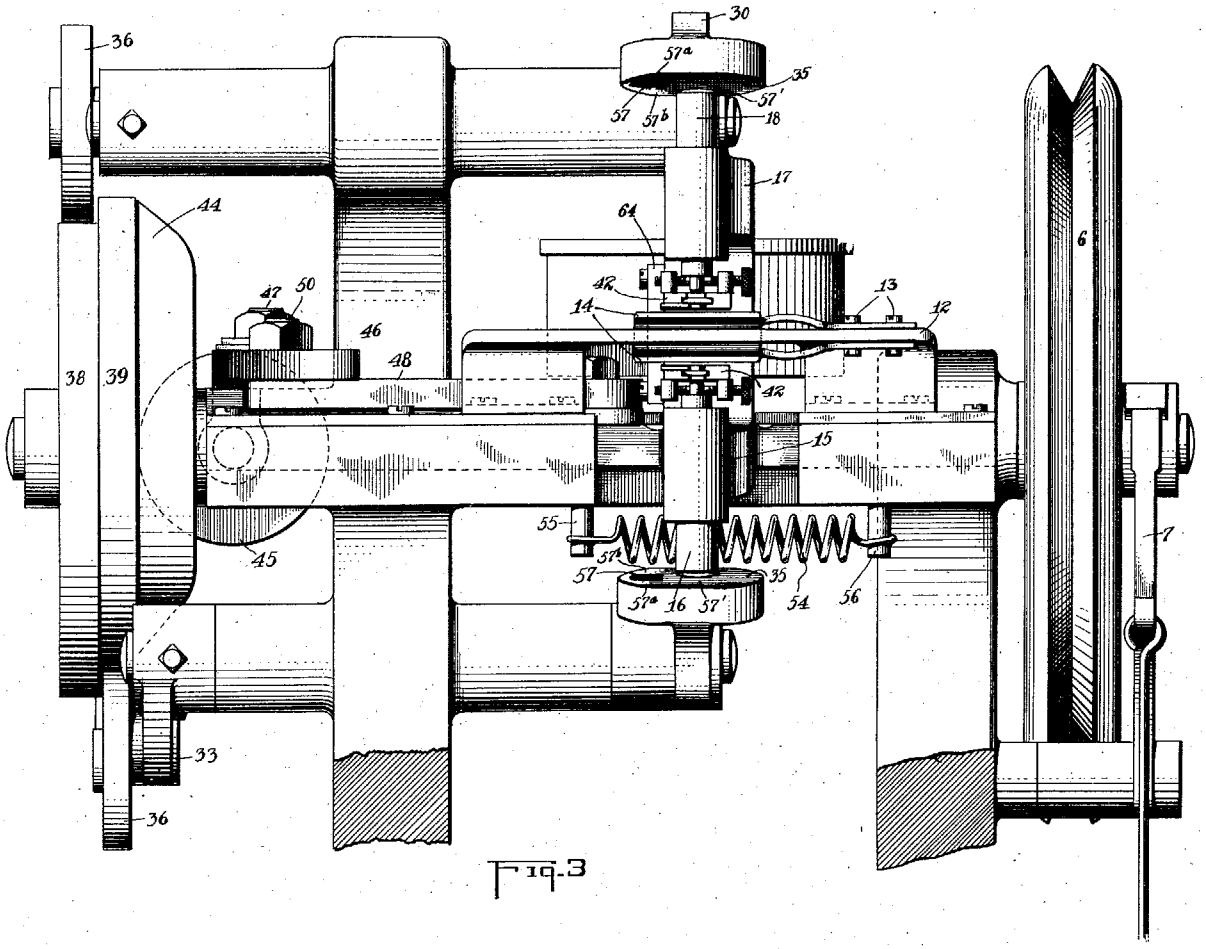
Fig. 3 is a front view looking in the direction of arrow 3 in Fig. 1 with the base broken away.

The base support 1 of the machine has an upstanding pedestal 2 which is equipped with bearings 4 for the operating shaft 5 of the machine, this shaft being shown as driven by a suitable belt pulley 6 with a usual stop device 7 associated therewith. The pedestal support 2 has a forwardly and downwardly projected extension 8 in which is formed a slideway 9 for a slide block member 10 which carries the punch devices and sets as presently described. At the top and front of the base extension 8 is fixed as at 11 a material support 12 in the form of a heavy plate bent upwardly and then at right angles forwardly and downwardly as shown. At each side of this plate are adjustably fixed at 13 spring presser plates 14 adapted to press the material against the support as it is punched and eyeleted, and fed along.

The slide block member 10 which receives periodic endwise movement as presently described has a lower transversely projecting arm 15 carrying the lower punch and set mechanism 16 and it bears over this arm 15 another transversely projecting arm 17 in which is fitted the upper punch and set mechanism 18 arranged opposite the punch and set 16. Referring now to the particular construction of the punch and set mechanisms, both of these being alike, the ends of the arms in which they are mounted are formed with bores 19 having inturned flanges 20 at their inner ends. In each of these bores is slidably fitted a sleeve 21 having an intermediate shoulder against which presses a spring 22 which reacts against the flange 20 thus keeping the sleeve normally drawn outward. Sleeve 21 is counterbored to form an enlarged cavity, and the inner end is internally threaded to receive the externally threaded body of the set 23 which may thus be adjustably fitted to said sleeve and then locked in adjusted position by a lock nut 24. The punch 25 is hollow and slidably fitted through the set 23 with an extension reaching up through the sleeve 21 in which its upper end is guided. An intermediate portion of this punch extension is formed with a flange 26 upon which presses a coiled spring 27 reacting against the base of the cavity of sleeve 21 to project the punch normally outward from the set to operative position. The extent to which it may thus be projected is adjustably limited by a stop nut 28 threaded on the inside of sleeve 21. Thus the punch and set together are held yieldingly retracted by the spring 22 while the punch is held yieldingly projected from the set by the spring 27, it being noted that in this position the back of the punch is flush with the back of the sleeve 21, both these being preferably rounded as indicated at 29.

Means is provided for forcing the punch and set forward for the punching and setting operations, and for this purpose I show an upper lever or hammer 30 fulcrumed at 31 in an extension 32 of the base for acting on the upper punch and set and a lower lever or hammer 33 fulcrumed at 34 in the base for acting on the lower punch and set. These levers have similar operating faces 35, having for successive operation solid punch actuating portions or elements 57′ and set actuating elements $57^a$, $57^b$, either side of a central slot or recess 57 deep enough to permit the punches to recede or telescope within the sets but not wide enough to permit the sets to recede therein, adapted to engage the outer ends of the punches and set sleeves. Each lever carries at a distance inward from its fulcrum a roll 36 adjustably fitted to an elongated slot therein as seen at 37, each of these rolls being adapted to ride upon one of a pair of similar cams 38, 39 fixed on the shaft 5 for controlling the punch and set movements. The inner ends of the levers are yieldingly drawn together to hold the rollers 36 against their respective cams by a coil spring 40 secured at its two ends to the respective levers with a threaded adjuster 41 at one end. Since the cams 38, 39 are similar and oppositely disposed to actuate the respective levers a description of one of them will suffice for both. The cam 38 in the position shown is presenting its lowest portion $38^a$ to the roll 36. Thence as it turns in the direction of the arrow a gradual rise $38^b$ causes the punch to descend picking an eyelet *e* from the forward end of a raceway 42 more particularly described later and slipping the eyelet over the punch till its flange rests against the set as the punch descends upon the material. A further rise $38^c$ in the cam then moves the punch to force it through the material against the mating punch device comprising the punch block surface of material support 12. Thereupon the cam continues with a slight step down as indicated at $38^d$ in a concentric portion $38^e$ of a substantial arc, this slightly lowered portion relieving the punch from the punch block surface but not moving it back enough to move it out of the material. In this interval the punches and sets are simultaneously moved laterally to feed the material and space the eyelets as presently described, bringing the set opposite the clenching surface 43 which may be formed as an annular concave groove suitable for turning out the lower flange of the eyelet and clenching it against the stock. Thereupon a final rise $38^f$ in the cam moves the set downward for clenching the eyelet, the punch at this time telescoping within the set as now to be described. The cam then returns to its lowermost portion $38^a$ which continues concentric through a considerable arc during which time the punch and set are returned laterally to initial position after being raised clear of the work and above the eyelet raceway. The corresponding parts of cam 39 being correspondingly designated on the drawings the operation thereof on the lower punch and set will be readily understood.

For effecting the endwise movement of the slide block 10 to move the punches and sets laterally as described, a lateral face cam 44 is fixed on the shaft 5. This cam is engaged by a roller 45 on the outer end of lever 46 fulcrumed at 47 to the frame work with its inner end engaged with a link 48, the other end of which has pivotal engagement at 49 with the block 10. The engagement of lever 46 with the link 48 is by means of a pin 50 engaged in the link 48 and adapted to be adjustably clamped in any part of an elongated slot 51 of the lever by means of a flange 52 thereon and a clamp nut 53 threaded thereto. The purpose of adjusting the point of engagement of this link end along the lever 46 is to vary the extent of movement of the block 10 and hence the spacing of the eyelets as effected by the lateral movement of the punches while engaged in the material. It will be understood that the formation of lateral cam 44 is such as to move the punches laterally for feeding while they are under the action of the portions $38^e$ and $39^e$ of the respective peripheral cams and to permit return of the punches to initial position while the portions $38^a$ and $39^a$ of the peripheral cams are active. This lateral return of the punches to initial position is effected by a stout coil spring 54 engaged with a pin 55 on the block 10 at one end and with a pin 56 on the frame work at its other end. It will be understood that as the punch and set mechanisms are thus moved laterally they slide along the faces 35 of the levers 30, 33, respectively, which are made wide enough to permit this lateral movement.

The upper and lower eyelet raceways 42 are similar but oppositely disposed so as to present the eyelets properly to the material at the opposite sides of the support. These raceways are adapted to deliver eyelets of widely varying sizes and hold them properly alined to be caught by the punches and for this purpose I provide an extension to the main raceway portions 58 consisting in lateral portions 59, 60 pivoted to the main portions at 61 and adapted to be simultaneously adjusted toward or from each other by a screw 62 which has its two end portions oppositely threaded and engaged with nuts 63 on the respective lateral portions of the raceway. Thus by merely turning this screw the delivery portion of the raceway may be adjusted to any width required. The raceways 42 are carried in the slide block 10 as best shown in Fig. 4, being guided for endwise sliding movement therein and held in place by a retaining plate 64. These raceways and a hopper 65 which supplies the eyelets thereto are moved so as to bring the foremost eyelets into alinement with the punches at the proper intervals and then move back out of the way for the setting operation, and for this purpose I show a cam 66 fixed on the shaft 5 and engaging a depending abutment member 67 on the raceways. As a means for starting the eyelets in the respective raceways so that they will face in opposite directions as required I provide a plate 68 intermediate the height of the hopper with a groove 69 therein and leading to the upper raceway, this groove being of a width to permit the shanks of the eyelets to drop thereinto and the eyelets rest on their flanges to slide out along the raceway. The lower raceway leads out from the bottom of the hopper with spaced apart guides 70 so as to permit the upstanding shanks to slide therealong as they rest on their flanges. It will be understood that the mass of eyelets in the hopper is agitated by the reciprocating lateral movement imparted from the slide block 10 to the raceways which support the hopper, and this agitation is promoted by the operation of the cam 66 which reciprocates the raceways endwise and of course the hopper along with them. In addition to this a suitable brush device (not shown) may be employed in the hopper to be moved for stirring up the eyelets to start them in their respective raceways.

While the members 30, 33 have been referred to as levers or hammers, for convenience in construction and assemblage each of these members is shown as formed of separate lever arms spaced apart laterally and fixed to a shaft; thus what has been called the hammer lever 30 is made up of the arms $30^a$, $30^b$ fixed at the respective ends of a shaft $30^c$ journaled at the fulcrum point 31.

The operation of the described mechanism will be understood from the foregoing description and needs to be only briefly summarized: The two pieces of material being supplied to the opposite sides of the material support 12 underneath the presser plates 14, the operation of the machine causes the two punches to be pressed forward simultaneously while held positively projected from the sets, the initial part of their movement being relatively slow. In this movement each of the punches takes up the foremost eyelet from its raceway and as the raceways move back out of the way and the punches continue to move forward, the eyelets slip back on the punches as the punches are pressed through the material against the punch block surfaces of the support 12, the flange ends of the oppositely facing eyelets on the two punches coming up against the respective sets. Then the punches being slightly moved back so as to be relieved from the punch block surfaces, the lateral cam 44 comes into action to move the punches and sets laterally the distance the eyelets are to be spaced, *i. e.*, from some variable initial position to a position opposite the clenching surfaces 43, this variable initial position being determined by the adjustment of pin 50 in the slot 51. The contour and arrangement of the elongated slot 51 is such that it compensates for the varying in the positions of the punch and set mechanisms relative to the clenching surfaces 43 that would otherwise occur by adjustment of the pin 50 in said slot, so that notwithstanding such adjustment the punch and set mechanisms always come to rest in operative position opposite the clenching surfaces 43. This lateral shifting of the punch and set mechanisms brings the sets opposite the recesses 57 in the lever faces 35. Thereupon a further movement of the levers 30, 33 under the action of the portions $38^t$, $39^t$ of their respective cams moves the sets farther forward to effect the clenching of the eyelets, the punches as this occurs receding within the sets, since their rear ends may move back into the recesses 57 which are too small to receive the set sleeves 21. Then the punch and set mechanisms being permitted to move out of the material and back of the raceways by the lower portions of the cams and being returned to initial lateral position by the spring 54, the cycle of operation is completed.

It will be noted that the sets 23 are conveniently adjustable in the set sleeves by their threaded engagement therewith to be locked by the nuts 24 so that they may be set accurately according to the requirements of the particular work in hand and the normal forward projection of the punches as yieldingly held forward can also be determined by adjustment of the nut 28. A further means whereby the operating movements of the punch and set mechanisms can be varied as required is provided by the elongated slots 37 which permit an adjustment of the rolls 36 toward and from the fulcrums of their respective levers. It is to be especially noted that in my improved construction the punch and set mechanisms are held accurately alined and guided both for their rectilinear lateral movements as they are carried transversely by the movement of the block 10, and also for their operative in-and-out movement as guided in the arms 15, 17, of said block, the rectilinear spacing movement thus provided being an important aid in permitting the guiding of the work rapidly and easily.

I am aware that the invention can be embodied in other specific forms as to its various features without departing from the spirit thereof and I therefore desire the present embodiment to be considered as illustrative and not restrictive referring rather to the appended claims to indicate the scope thereof.

Having described my invention, what I claim as new and desire to secure by Letters Patent is:

1. A duplex eyeleting machine, comprising a pair of telescopically combined punch and set mechanisms mounted opposite each other, a material support equipped with punch block and clenching surfaces at its two sides mounted between said punch and set mechanisms, means for first moving said punches simultaneously to punch the material and thereafter moving the sets simultaneously to clench the eyelets, and means for moving the punches laterally while engaged in the material to feed the same and space the eyelets.

2. A duplex eyeleting machine, comprising a material support equipped with punch block and clenching surfaces on opposite sides, a plurality of telescopically combined punch and set mechanisms mounted to act against the opposite sides of said material support, mechanism for moving the punches forward to punch the material and thereafter moving the sets forward to clench the eyelets, and means for moving the punches laterally together while in the material to feed the same and space the eyelets.

3. A duplex eyeleting machine, comprising a material support having punch block and clenching surfaces on its opposite sides, a plurality of telescopically combined punch and set mechanisms mounted to operate on the opposite sides of said material support, a single actuating mechanism for operating said punch and set mechanisms to first punch the material and thereafter clench the eyelets, and a single actuating means for moving the punches laterally while in the material to feed the same and space the eyelets.

4. A duplex eyeleting machine, comprising material supporting means having punch block and clenching surfaces on opposite sides thereof, a plurality of telescopically combined punch and set mechanisms, a common mounting therefor holding said mechanisms in opposite relation, means for operating said mechanisms simultaneously to first punch the materials and thereafter clench the eyelets, and means for moving the punch and set mechanisms together laterally while the punches are in the material to space the eyelets.

5. A duplex eyeleting machine, comprising stationary means for supporting material having punch block and clenching surfaces at opposite sides, a pair of telescopically combined punch and set mechanisms oppositely mounted in operative relation to said material supporting means, means for operating said mechanisms to first punch holes in the materials and thereafter clench the eyelets, a pair of eyelet raceways adapted to feed lines of eyelets with the two lines facing oppositely to a position where the foremost ones are taken on by the punches as they move forward, and means for moving said punch and set mechanisms laterally between eyeleting operations to feed the material and space the eyelets.

6. A duplex eyeleting machine, comprising a pair of telescopically combined punch and set mechanisms mounted to operate opposite each other, material supporting means between said mechanisms equipped with punch block and clenching surfaces, means for first moving the punches in said mechanisms forward to punch the materials and insert the eyelets, means for thereafter moving the sets forward to clench the eyelets, means for feeding a line of eyelets in operative relation to each of said punches, and means for moving said punch and set mechanisms laterally between eyeleting operations to feed the material and space the eyelets.

7. A duplex eyeleting machine, comprising a pair of telescopically combined punch and set mechanisms, a common mounting for holding said mechanisms to move toward and from each other, a stationary material support between said mechanisms, means for operating said mechanisms to punch the materials and thereafter clench the eyelets, and means for moving said mounting laterally between eyeleting operations by a predetermined variable amount to slide the material over said support and space the eyelets, said mounting having provision to engage the material for effecting said sliding movement.

8. A duplex eyeleting machine, comprising means for supporting material equipped with punch block and clenching surfaces at its opposite sides, a plurality of oppositely disposed telescopically combined punch and set mechanisms for coöperating with said material supporting means, mechanism for imparting punching and clenching movements to the punch and set portions of said mechanisms in succession respectively, a common mounting for said punch and set mechanisms equipped with means for reciprocating it laterally to feed the material, and eyelet raceways for the respective punch and set mechanisms slidably carried in said mounting and movable laterally therewith.

9. A duplex eyeleting machine, comprising a material support, a plurality of oppositely disposed punch and set mechanisms, a common mounting for said mechanisms fitted to reciprocate in a base support, means for operating said punch and set mechanisms, and means for reciprocating said mounting in timed relation thereto for feeding the material to space the eyelets.

10. A duplex eyeleting machine, comprising a plurality of oppositely disposed punch and set mechanisms, a material support disposed therebetween, a common mounting for said mechanisms fitted to slide in a base support, means for operating said mechanisms, means for laterally reciprocating said mounting in timed relation to the operation of said mechanisms for feeding the material, eyelet raceways fitted in said mounting to partake of the lateral reciprocation thereof, and means for moving said raceways endwise in timed relation to the movements of the punch and set mechanisms for supplying eyelets.

11. A duplex eyeleting machine, comprising a plurality of oppositely disposed punch and set mechanisms, a material support disposed therebetween, a common mounting for said mechanisms fitted to slide in a direction transverse thereof, a raceway for each of said punch and set mechanisms fitted to said mounting to move therewith and also to slide in a direction transverse thereof, means for operating said punch and set mechanisms, means for operating said mounting in timed relation thereto, and means for reciprocating said raceways.

12. An eyeleting machine, comprising a material support equipped with a punch block and a clenching surface, a telescopically combined punch and set mounted to coöperate with said support, a mounting for said punch and set mechanisms having means to move the same laterally at intervals for spacing the eyelets, and means for operating said punch and set mechanism, said means consisting in a presser head mounted and connected to reciprocate against the back of the punch and set, said head having one portion adapted to serve as a backing to press the punch forward for punching and another portion adapted to permit the punch to recede relative to the set while pressing the set forward to clench the eyelets.

13. An eyeleting machine, comprising a material support equipped with a punch block and a clenching surface, a telescopically combined punch and set mounted to coöperate with said support, a mounting for said punch and set mechanism having means to move the same laterally at intervals for spacing the eyelets, and means for operating said punch and set mechanism, said means consisting in a presser head mounted and connected to reciprocate against the back of the punch and set, said head having one portion adapted to serve as a backing to press the punch forward for punching and another portion formed with a recess adapted to permit the punch to recede relative to the set while pressing the set forward for clenching the eyelets.

14. In an eyeleting machine, a telescopically combined punch and set consisting in a hollow set sleeve having a punch slidably fitted therein with means for holding the punch normally projected, the set proper having threaded connection with the set sleeve whereby it may be adjusted relative thereto for the purpose stated, and means for locking the set proper in variable adjusted positions relative to the set sleeve.

15. In an eyeleting machine, a telescopically combined punch and set consisting in a hollow set, a punch fitted to slide therein, means for holding the punch yieldingly projected, and means adjustable in the set for limiting the forward projection of the punch.

16. A telescopic punch and set mechanism for fastener setting machines comprising, in combination, a supporting sleeve, having one end thereof counterbored to form an enlarged cavity, a punch device slidable in said sleeve and provided with a shoulder, a coiled spring in said cavity and interposed between said punch device and sleeve and bearing upon said shoulder and the base of the cavity, respectively, and stop means for limiting the outward movement of the punch.

17. A telescopic punch and set mechanism for fastener setting machines comprising, in combination, a hollow sleeve internally threaded adjacent one end, an externally threaded perforated setting tool engageable with the internal threads of said sleeve, a nut engageable with the threads of said setting tool to limit the retraction of said tool within said sleeve, and a punch carried in said sleeve and arranged to project outwardly therefrom through the perforation in said setting tool.

18. A telescopic punch and set mechanism for fastener setting machines comprising, in combination, a supporting sleeve, a shoulder formed within said sleeve, a punch device slidable within said sleeve and provided with a shoulder, a spring within said sleeve and having its ends bearing against said respective shoulders to thereby project the punch device, a setting tool carried by said sleeve, and a stop for limiting outward movement of the punch.

19. In a fastener setting machine, a punching device, a setting device, a hammer having an element for actuating said punching device and an element for actuating said setting device, and means for relatively moving said hammer and devices laterally in the direction of progression of the work through the machine for successive actuation of said devices by said respective elements.

20. In a fastener setting machine, a punching device and a setting device telescopically arranged, a hammer for actuating said devices, said hammer being provided with a punch operating element and a set operating element, and means for relatively moving said hammer and devices laterally for successive engagement thereof by said respective hammer elements.

21. In a fastener setting machine, a punching device and a setting device telescopically arranged, an operating member for said devices, and means for relatively moving said devices and member laterally for successive operation of said devices by said member.

22. In a fastener setting machine, a punch device and a setting device, telescopically arranged, a hammer for actuating said devices and movable in a vertical plane, said hammer being provided with a punch operating element and a set operating element, and means for laterally moving the punch and set for successive engagement thereof by said respective hammer elements.

In testimony whereof, I have signed my name to this specification.

FRANK L. HARMON.